(12) United States Patent
Browning et al.

(10) Patent No.: US 6,415,388 B1
(45) Date of Patent: *Jul. 2, 2002

(54) METHOD AND APPARATUS FOR POWER THROTTLING IN A MICROPROCESSOR USING A CLOSED LOOP FEEDBACK SYSTEM

(75) Inventors: Chris S. Browning; Shekhar Y. Borkar, both of Beaverton; Gregory E. Dermer, Portland, all of OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,255

(22) Filed: Oct. 30, 1998

(51) Int. Cl.$^7$ ............................................... G05D 23/00
(52) U.S. Cl. ....................................... 713/322; 702/132
(58) Field of Search ................................ 713/300, 340; 702/132

(56) References Cited

U.S. PATENT DOCUMENTS

| | | | | |
|---|---|---|---|---|
| 3,842,348 A | * | 10/1974 | Goshy | |
| 4,370,723 A | * | 1/1983 | Huffman et al. | 364/483 |
| 4,924,404 A | * | 5/1990 | Reinke, Jr, | |
| 5,291,607 A | * | 3/1994 | Ristic et al. | 713/300 |
| 5,339,445 A | * | 8/1994 | Gasztonyi | 713/324 |
| 5,367,638 A | * | 11/1994 | Niessen et al. | 710/57 |
| 5,383,137 A | * | 1/1995 | Burch | 395/500.44 |
| 5,422,806 A | * | 6/1995 | Chen et al. | 364/149 |
| 5,543,666 A | * | 8/1996 | Priesemuth | 307/39 |
| 5,557,557 A | * | 9/1996 | Frantz et al. | 395/500.43 |
| 5,560,022 A | * | 9/1996 | Dunstan et al. | 713/300 |
| 5,583,419 A | * | 12/1996 | Haller | 322/8 |
| 5,586,332 A | | 12/1996 | Jain et al. | |
| 5,623,647 A | | 4/1997 | Maitra | |
| 5,634,131 A | | 5/1997 | Matter et al. | |
| 5,655,127 A | | 8/1997 | Rabe et al. | |
| 5,664,202 A | * | 9/1997 | Chen et al. | |
| 5,719,800 A | * | 2/1998 | Mittal et al. | |
| 5,724,591 A | * | 3/1998 | Hara et al. | 713/322 |
| 5,726,901 A | * | 3/1998 | Brown | 702/61 |
| 5,745,375 A | | 4/1998 | Reinhardt et al. | |
| 5,761,517 A | * | 6/1998 | Durham et al. | |
| 5,832,284 A | * | 11/1998 | Michail et al. | 713/322 |
| 5,929,604 A | * | 6/1999 | Irvin | |
| 5,940,785 A | * | 8/1999 | Georgiou et al. | 702/132 |
| 5,940,786 A | * | 8/1999 | Steeby | 702/132 |
| 5,941,991 A | * | 8/1999 | Kageshima | 713/340 |
| 5,944,829 A | * | 8/1999 | Shimoda | 713/324 |
| 5,949,689 A | * | 9/1999 | Olson et al. | 364/488 |
| 5,973,542 A | * | 10/1999 | Okayasu et al. | 327/378 |
| 5,996,084 A | * | 11/1999 | Watts | 713/323 |
| 6,021,401 A | * | 2/2000 | Oravetz et al. | 705/412 |
| 6,055,640 A | * | 4/2000 | Kageshima et al. | 713/320 |
| 6,076,171 A | * | 6/2000 | Kawata | 713/322 |

FOREIGN PATENT DOCUMENTS

WO        WO 97/12329        4/1997

* cited by examiner

Primary Examiner—Paul R. Myers
(74) Attorney, Agent, or Firm—Blakely, Sokoloff, Taylor & Zafman LLP (57) ABSTRACT

A method and apparatus for power throttling in a microprocessor. A voltage source supplies voltage to the microprocessor, and a clock source operates the microprocessor at a desired frequency. In one embodiment, a power monitor is configured to measure the short term power consumption of the microprocessor. In another embodiment, a temperature sensor measures the temperature of the microprocessor. Control logic is coupled to the voltage source and the clock source. The control logic receives an indication of the power consumption or temperature, as applicable, and compares it to a predetermined value. In response to the comparison, the control logic varies the supply voltage and the frequency.

26 Claims, 7 Drawing Sheets

METHOD AND APPARATUS FOR POWER THROTTLING IN A MICROPROCESSOR USING A CLOSED LOOP FEEDBACK SYSTEM

FIELD OF THE INVENTION

The present invention relates generally to computer systems architecture, and, more particularly, to a method and apparatus for power throttling in a microprocessor system using a closed loop feedback system.

DESCRIPTION OF THE RELATED ART

The clock speed of microprocessors has increased dramatically over the past several years. In the early eighties, microprocessors had clock speeds typically ranging from 5 to 16 MHz, which was sufficient to handle computer applications during that time period. However, as computer applications became more complex over the years to meet the demands of the computer user, the sluggish processor speeds of the past did not suffice. Today, microprocessors have clock speeds far exceeding those of the past, running at more than 300 MHz. And, these clock speeds show no sign of reaching a pinnacle. The microprocessors of the not-too-distant future have projected clock speeds that will significantly dwarf today's clock speed standards. With these higher clock speeds, microprocessors are capable of handling more and more complex computer applications in shorter periods of time, thus providing inherent benefits to the computer user.

Although the dramatic increase in the microprocessor's clock speed over the years has enabled the computer user to run more complex computer applications at faster speeds, it has posed problems for the computer systems designer. Such a significant increase in clock speed causes a substantial increase in the power consumed by the microprocessor, thus requiring the need for larger and more powerful power supplies. As the peak power of the microprocessor has increased to meet this demand for increased clock speed, the spread between the peak power and the average power that is typically consumed by the microprocessor has significantly increased as well.

Generally, a computer system is designed to account for the peak power consumed by the computer using higher delivery power supplies and adequate cooling devices to dissipate the peak power, even though this peak power consumption is seldom realized. This "overdesign" places unnecessary guard bands in the power and thermal design of the computer, thus increasing its cost and placing various limitations on the computer user. That is, a larger power supply adds weight and increases the size of the computer, which is particularly disadvantageous to the user of a portable computer, for example.

One method used to control the power consumption of a microprocessor is to adjust the effective frequency (i.e., clock speed) of the microprocessor to reduce the power. Since power is a linear function of the clock speed, the power reduces linearly with a decrease in the clock speed.

The present invention is directed to overcoming, or at least reducing the effects of, one or more of the problems set forth above.

SUMMARY OF THE INVENTION

In one aspect of the present invention, a method for power throttling in a microprocessor having a voltage source and a clock applied thereto is provided. The method includes monitoring the short term power consumption of the microprocessor, comparing the power consumption to a predetermined value, and varying the clock speed and the supply voltage of the microprocessor in response to the comparison. In an alternative embodiment, the temperature of the microprocessor is the measured variable, rather than the short term power consumption. In such an embodiment, the measured temperature is compared to a predetermined value, and in response thereto, the clock speed and supply voltage are varied.

In another aspect of the invention, a power throttling device includes a microprocessor, a voltage source to supply voltage to the microprocessor, a clock source to operate the microprocessor at a desired frequency, and a power monitor configured to measure the short term power consumption of the microprocessor. Control logic is coupled to the voltage source and the clock source. The control logic is adapted to receive an indication of the power consumption from the power monitor and compare the power consumption to a predetermined value, and in response to the comparison, vary the supply voltage and the frequency. In an alternative embodiment, a temperature sensor is provided in place of the power monitor to measure the temperature of the microprocessor. The control logic receives an indication of the measured temperature from the temperature sensor and compares it to a predetermined value. In response to the comparison, the control logic varies the supply voltage and the frequency.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nonetheless be a routine undertaking for those of ordinary skill in the art having the benefit of this disclosure.

Figure 1:
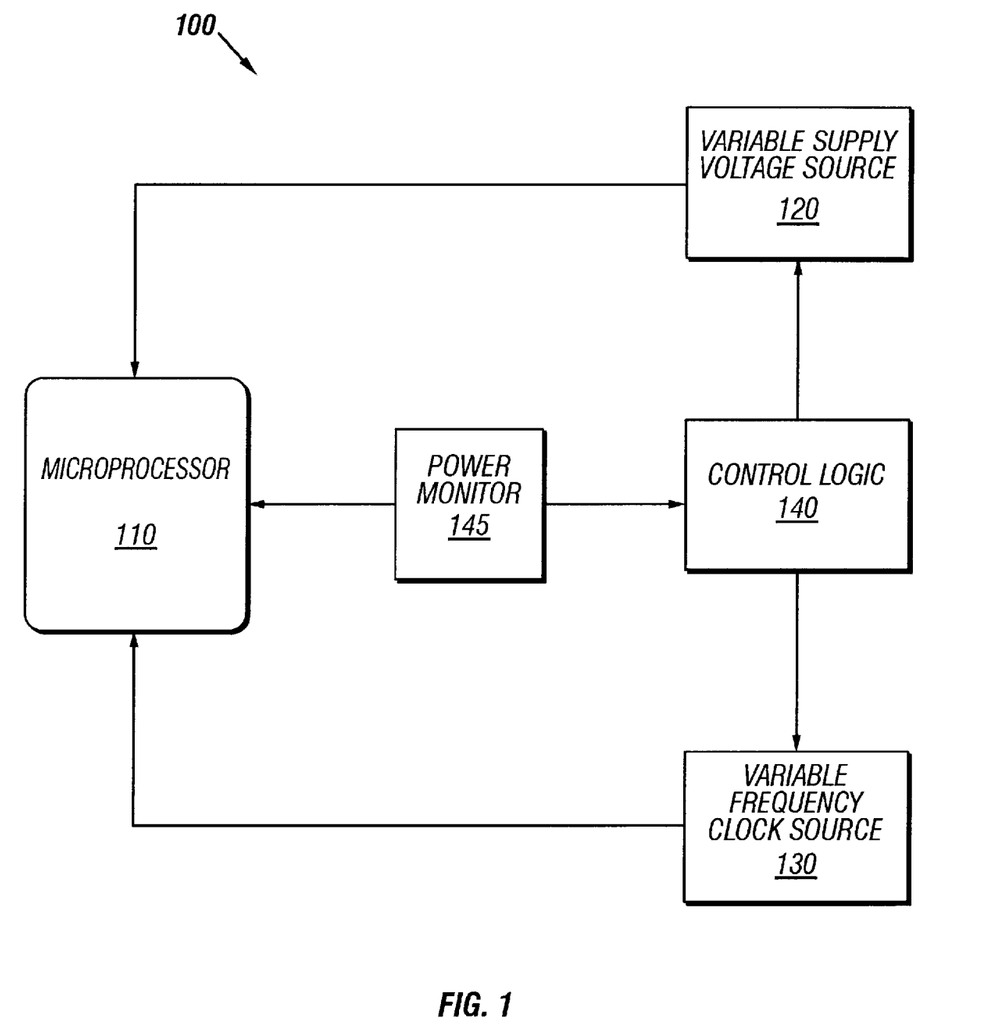
FIG. 1 is a block diagram of a power throttling closed loop feed back system in accordance with an embodiment of the present invention, in which power consumption is the measured variable in the closed loop feed back system.

Turning now to the drawings, and specifically referring to FIG. 1, a block diagram of a power throttling closed loop feedback system 100 is shown in accordance with one embodiment of the present invention. The system 100 includes a microprocessor 110, which, in accordance with one embodiment, is a Pentium® II processor manufactured and sold by Intel Corporation of Santa Clara, Calif. However, it will be appreciated that the microprocessor 110 could be any type of commercially available processor, and, thus need not be limited to any one specific type.

In accordance with one embodiment, the system 100 is part of a computer system (not shown), such as a personal computer (PC). However, it will also be appreciated that the system 100 could be employed in various other types of systems or devices, which would use the microprocessor 110 to control their functions, without departing from the spirit and scope of the present invention.

The system 100 further includes a supply voltage source 120, which is coupled to the microprocessor 110 to supply power thereto. In one embodiment, the voltage source 120 is a variable voltage source comprising a conventional switching voltage regulator. A clock source 130 also is coupled to the microprocessor 110 to control the frequency (i.e., clock speed) of the microprocessor 110. In accordance with one embodiment, the clock source 130 frequency is variable, and may be constructed using a phase locked loop (PLL).

Control logic 140 is coupled to both the variable supply voltage source 120 and the variable frequency clock source 130 to control the operation of these devices. The system 100 also includes a power monitoring device 145 that is configured to measure the short term power consumption of the microprocessor 110. The power consumption measurement is considered short term as compared to the power consumption rate of change. In one embodiment, the power monitoring device 145 includes a known resistance coupled between the voltage source 120 and the microprocessor 110. Power consumption may be determined based on the voltage across the resistance and knowledge of the voltage provided by the voltage source 120. This is but one exemplary power monitoring scheme. One skilled in the art having the benefit of this disclosure may employ other means for monitoring power consumption of the microprocessor 110.

Figure 2:
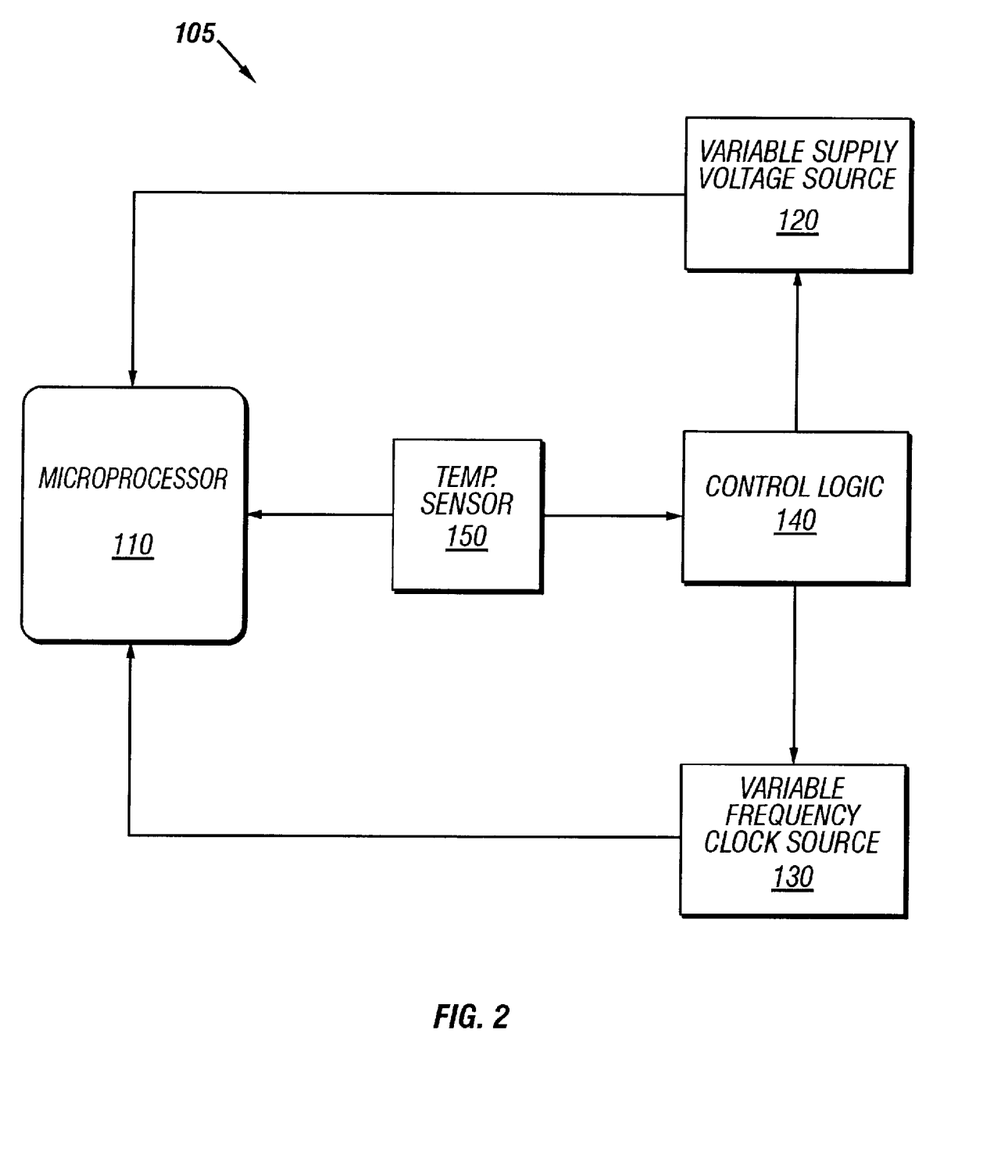
FIG. 2 is a block diagram of a power throttling closed loop feed back system in accordance with another embodiment of the present invention, in which temperature is the measured variable in the closed loop feed back system.

Another embodiment of a system 105 in accordance with the present invention is illustrated in FIG. 2. A temperature sensor 150 monitors a temperature $T_d$ of the microprocessor 110. In accordance with a particular embodiment, the temperature sensor 150 measures the temperature of the silicon die (not shown) that includes the integrated circuitry of the microprocessor 110. In an alternative embodiment, the temperature sensor 150 could also be configured to measure the temperature of the package case (not shown) that surrounds the silicon die of the microprocessor 110. Although the temperature of the silicon die and the package case of the microprocessor 110 are directly related, it is desirable to measure the temperature of the die for a more accurate temperature reading.

The microprocessor 110 is capable of running various types of commercially available computer applications thereon. Typically, more complex operations performed by the microprocessor 110, when running a particular application, will cause the power consumption and the temperature $T_d$ of the microprocessor 110 to increase. For example, if the microprocessor 110 has a three-dimensional graphics application running thereon, it typically will work harder to process the more complex operations that are required by the 3D graphics application. However, when the microprocessor 110 is running a word-processing application, for example, the microprocessor 110 may not endure any complex processing (especially when compared to that of the 3D graphics application). Accordingly, as the microprocessor 110 works harder to process more complex operations (such as complex 3D graphics), the power consumption and temperature $T_d$ of the microprocessor 110 will generally rise. And, when the microprocessor 110 processes less complex operations (such as word-processing, for example), the power consumption and temperature $T_d$ of the microprocessor 110 will typically fall.

The control logic 140 monitors such rising and falling of the microprocessor's power consumption, or, in the embodiment illustrated in FIG. 2, the temperature $T_d$. The control logic 140 is operable to compare the power consumption or temperature $T_d$ to a predetermined value, and in response thereto, affect the voltage source 120 and the clock source 130 to vary the clock speed and the supply voltage. For instance, the clock speed and supply voltage may be varied in response to the power consumption or temperature $T_d$ exceeding, or approaching, the predefined value. Particularly, for throttling the microprocessor 110, the clock speed and supply voltage are reduced in response to the power consumption or temperature $T_d$ exceeding, or approaching, the predefined value.

In some embodiments, the comparison to a predefined value comprises comparing the measured variable to a predefined range. For example, referring to FIG. 2, when the temperature $T_d$ of the microprocessor 110 rises above an optimal operating range $T_1$–$T_2$ for the microprocessor 110, the control logic 140 will send a control signal to the variable frequency clock source 130 to decrease the frequency of the microprocessor 110. This will effectively slow down the clock speed of the microprocessor 110, which will cause the temperature $T_d$ of the microprocessor 110 to fall closer to, if not within, the optimal temperature range $T_1$–$T_2$ of the microprocessor 110. The optimal temperature range $T_1$–$T_2$ is predetermined and set by the system designer of the computer, in which the system 105 is a part.

While the microprocessor 110 is running at a reduced clock speed, the microprocessor 110 will typically not require as much power from the variable supply voltage source 120 as it did when it was running at the higher clock speed. Accordingly, the control logic 140 will also send a control signal to the variable supply voltage source 120 to reduce the power supplied to the microprocessor 110 such that enough power is supplied to have the microprocessor 100 run at the lower clock speed. By lowering the supply voltage, less power is consumed, which would be particularly beneficial if the system 105 were employed in a mobile or portable environment such as a laptop computer, for example.

As power is a linear function of frequency, reducing the clock speed (frequency) of the microprocessor results in a linear reduction in power consumption. However, since power has a quadratic relationship with supply voltage, varying both supply voltage in addition to varying the clock speed provides a significant power saving, as compared to power throttling by reducing frequency alone.

In particular embodiments, if the temperature sensor 150 measures the temperature $T_d$ of the microprocessor 110 to be below the lower limit $T_1$ of the optimal temperature range $T_1$–$T_2$, then the control logic 140 will send a control signal to increase the output of the variable supply voltage source 120 to adequately accommodate an anticipated increase in the clock speed of the microprocessor 110. Subsequently, the control logic 140 will also send a control signal to the variable frequency clock source 130 to increase the clock speed of the microprocessor 110, such that the temperature $T_d$ of the microprocessor 110 rises closer to, if not within, the optimal temperature range $T_1$–$T_2$. Due to the anticipated increase in clock speed of the microprocessor 110, the control logic 140 increases the supply voltage of the variable supply voltage source 120 to accommodate the subsequent increase in clock speed.

The control logic 140 has the temperature sensor continuously monitor the temperature $T_d$ of the microprocessor 110 such that the adjustments to the variable frequency clock source 130 and the variable supply voltage source 120 can be continually made to keep the microprocessor 110 operating within the optimal temperature range $T_1$–$T_2$. Hence, by controlling the system temperature, the cost of the system can be reduced because the necessity to overdesign the system with additional cooling for the peak power consumption has been eliminated.

Figure 3:
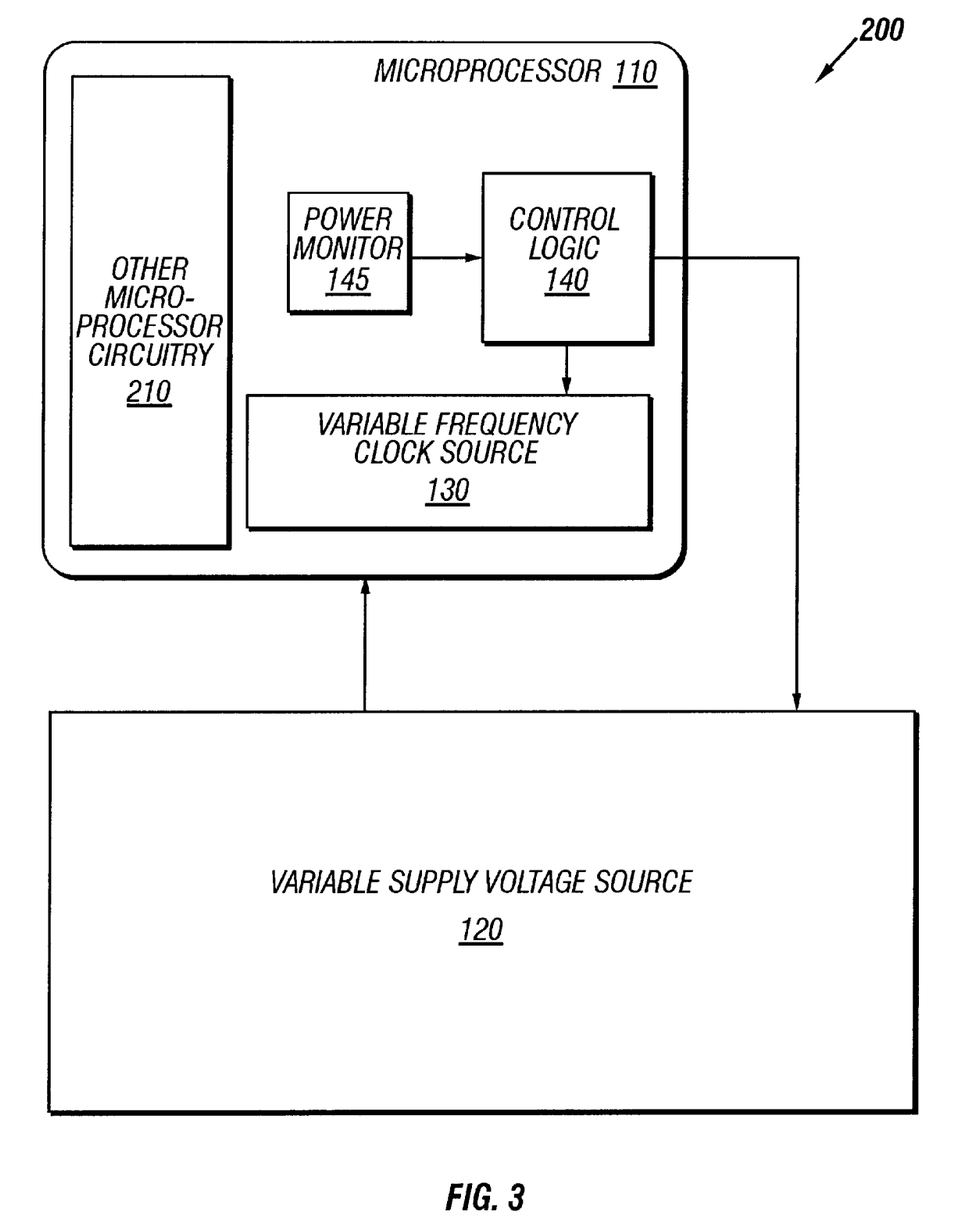
FIG. 3 is a block diagram of a power throttling closed loop feedback system in accordance with yet another embodiment of the present invention, in which various components of the system are integral with a microprocessor.
Figure 4:
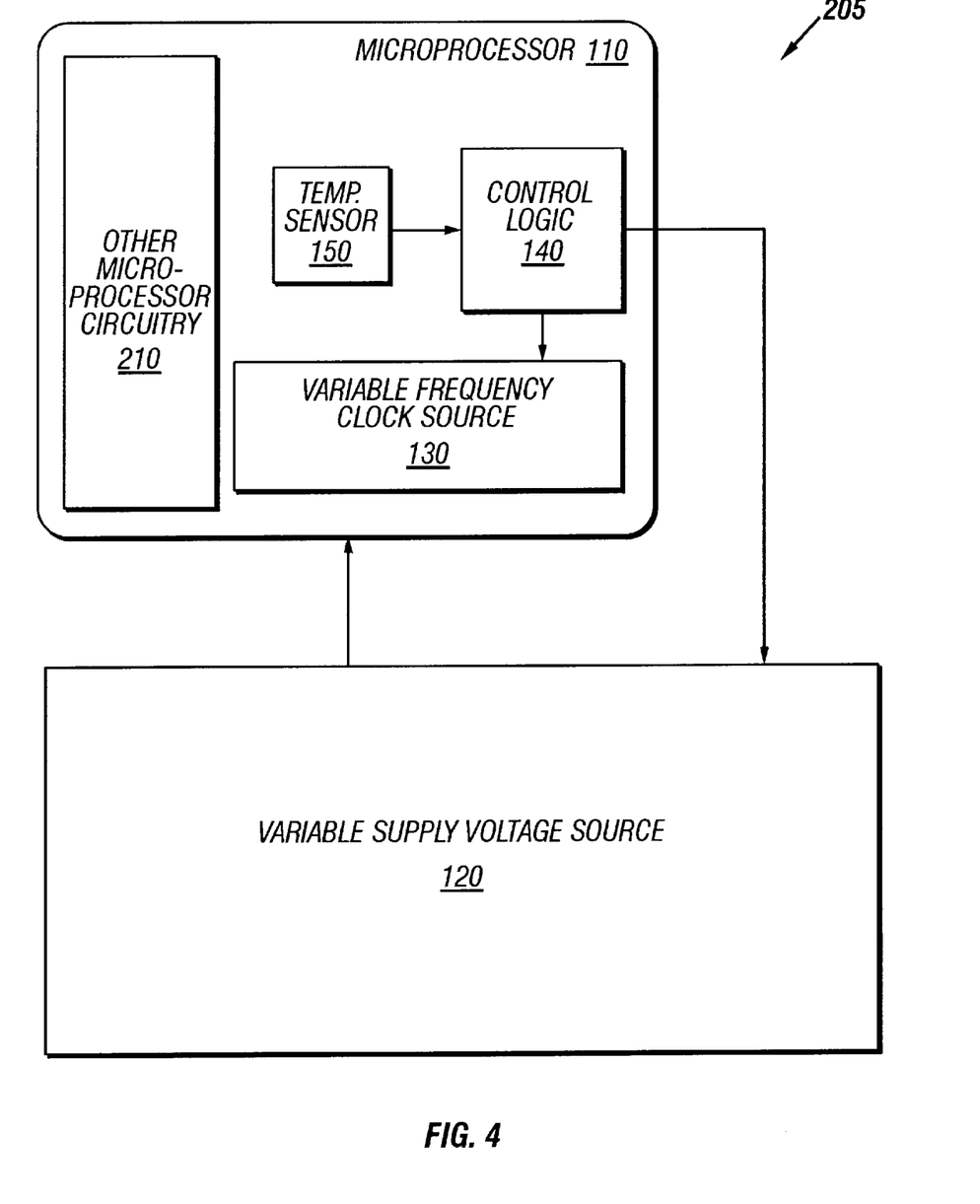
FIG. 4 shows an alternative embodiment of the power throttling closed loop feedback system illustrated in FIG. 3.

Turning now to FIGS. 3 and 4, block diagrams of power throttling closed loop feedback systems 200 and 205, respectively, are shown in accordance with embodiments of the present invention. In the particular embodiments illustrated in FIGS. 3 and 4, the power monitor 145 (FIG. 3) or temperature sensor 150 (FIG. 4), variable frequency clock source 130, and control logic 140 are all integrated on the die of the microprocessor 110. Of course, the variable supply voltage source 120 cannot be an integral part of the microprocessor 110 due to its physical size, and, thus remains as a separate component from the microprocessor 110. The microprocessor 110 further includes other microprocessor circuitry 210, as is well established in the art, to control the aspects of the computer system, for example.

Figure 5:
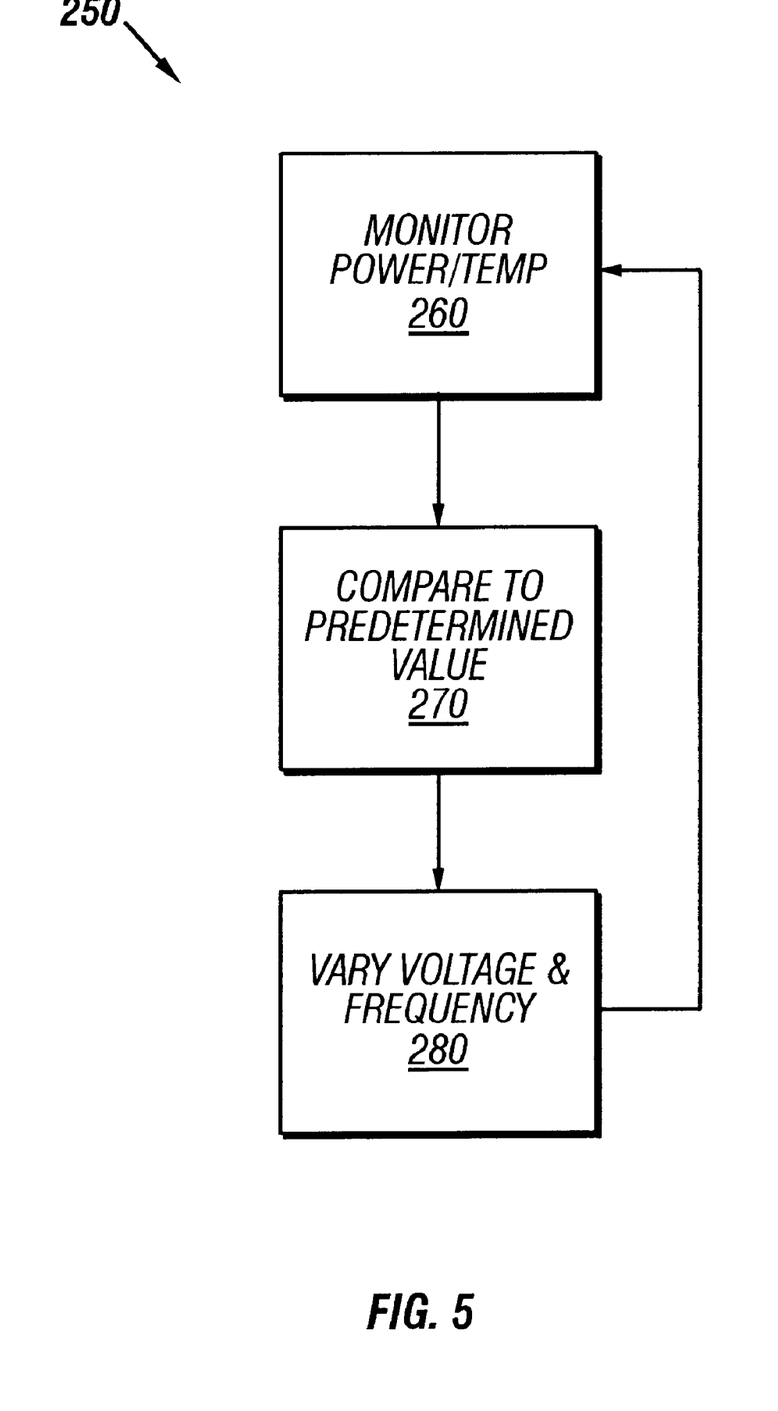
FIG. 5 shows a process for power throttling in accordance with an embodiment of the present invention, which may be performed by a control logic of FIGS. 1–4.

In FIG. 5, a process 250 for power throttling in a microprocessor in accordance with the present invention is illustrated. In step 260, either the short term power consumption or the temperature of the microprocessor 110 is monitored. In step 270, the power consumption or temperature is compared to a predetermined value, and in step 280 the clock speed and supply voltage are varied based on the comparison of step 270. Particularly, if the comparison of step 270 determines that the measured variable exceeds, or is approaching the predetermined value, the clock speed and supply voltage are adjusted to affect the measured variable—power consumption or temperature.

Figure 6:
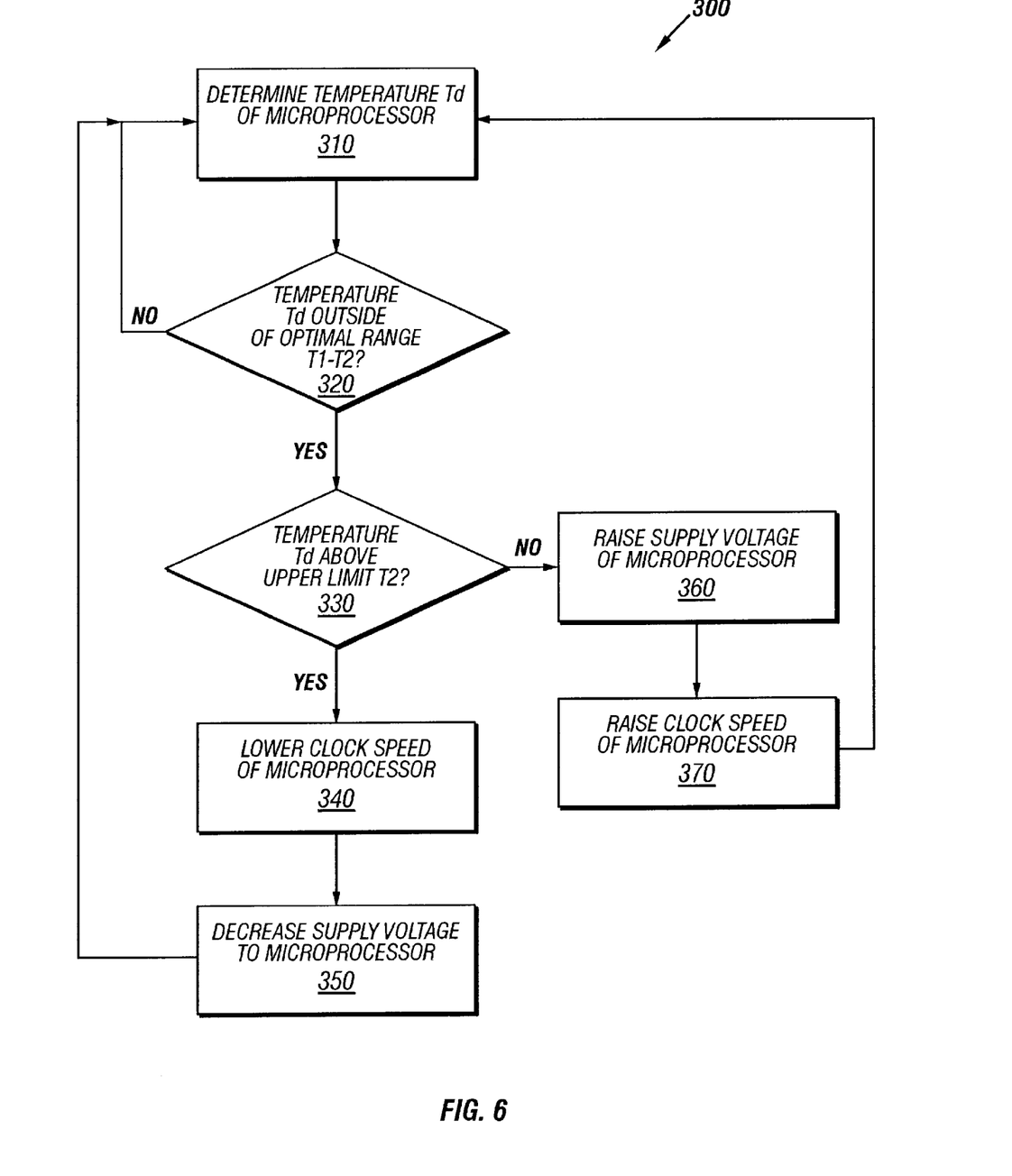
FIG. 6 shows a process for power throttling in accordance with a specific embodiment of the present invention, in which temperature is the measured variable in the closed loop feed back system.

Turning now to FIG. 6, an exemplary process 300 for performing the power throttling technique as performed by the control logic 140 is shown. The process 300 commences at step 310, where the control logic 140 determines the temperature $T_d$ of the microprocessor 110 via the temperature sensor 150. As previously mentioned, the temperature sensor 150 could monitor the temperature $T_d$ of the die directly or, in the alternative, of the package case that surrounds the microprocessor 110. Next, at step 320, the control logic 140 determines if the temperature $T_d$ of the microprocessor 110 is outside of the optimal temperature operating range $T_1$–$T_2$ of the microprocessor 110. If the temperature $T_d$ of the microprocessor 110 is within the temperature range $T_1$–$T_2$, the process 300 reverts back to step 310, where the control logic 140 again determines the temperature $T_d$ of the microprocessor 110 via the temperature sensor 150. On the other hand, if the temperature $T_d$ of the microprocessor 110 falls outside of the optimal temperature range $T_1$–$T_2$, then the process 300 advances to step 330, where the control logic 140 determines if the temperature $T_d$ of the microprocessor 110 is greater than the upper limit (i.e., $T_2$) of the temperature range $T_1$–$T_2$.

If the temperature $T_d$ of the microprocessor 110 is greater than the upper limit temperature $T_2$, then at step 340 the control logic 140 sends a control signal to the variable frequency clock source 130 to lower the clock speed of the microprocessor 110 by a predetermined amount. Subsequent to lowering the clock speed at step 340, the control logic 140 sends a control signal to the variable supply voltage source 120 at step 350 to lower the supply voltage to the microprocessor 110 to conserve power. Subsequent to adjusting the variable supply voltage source 120 (at step 350), the process 300 reverts back to step 310, where the temperature $T_d$ of the microprocessor 110 is again measured by the temperature sensor 150.

If the temperature $T_d$ of the microprocessor 110 is not above the upper limit $T_2$ at step 330, then it is assumed by the control logic 140 that the temperature $T_d$ of the microprocessor 110 is below the lower limit $T_1$. If the temperature $T_d$ is below the lower limit $T_1$ the process 300 proceeds to step 360, where the supply voltage of the variable supply voltage source 120 is raised to accommodate the anticipated increase in the clock speed of the microprocessor 110. Subsequently, at step 370, the control logic 140 sends a control signal to the variable frequency clock source 130 to increase the clock speed of the microprocessor 110, which will raise the temperature $T_d$ closer to, or within, the optimal temperature range $T_1$–$T_2$. Subsequent to adjusting the clock speed of the microprocessor 110, the process 300 reverts back to step 310, where the temperature $T_d$ of the microprocessor 110 is measured again by the temperature sensor 150. The particular process disclosed above in conjunction with FIG. 5, using two threshold temperatures, is exemplary only. Other feedback control systems may be employed to accomplish the power throttling technique illustrated in FIG. 6 without departing from the spirit of the present invention.

Figure 7:
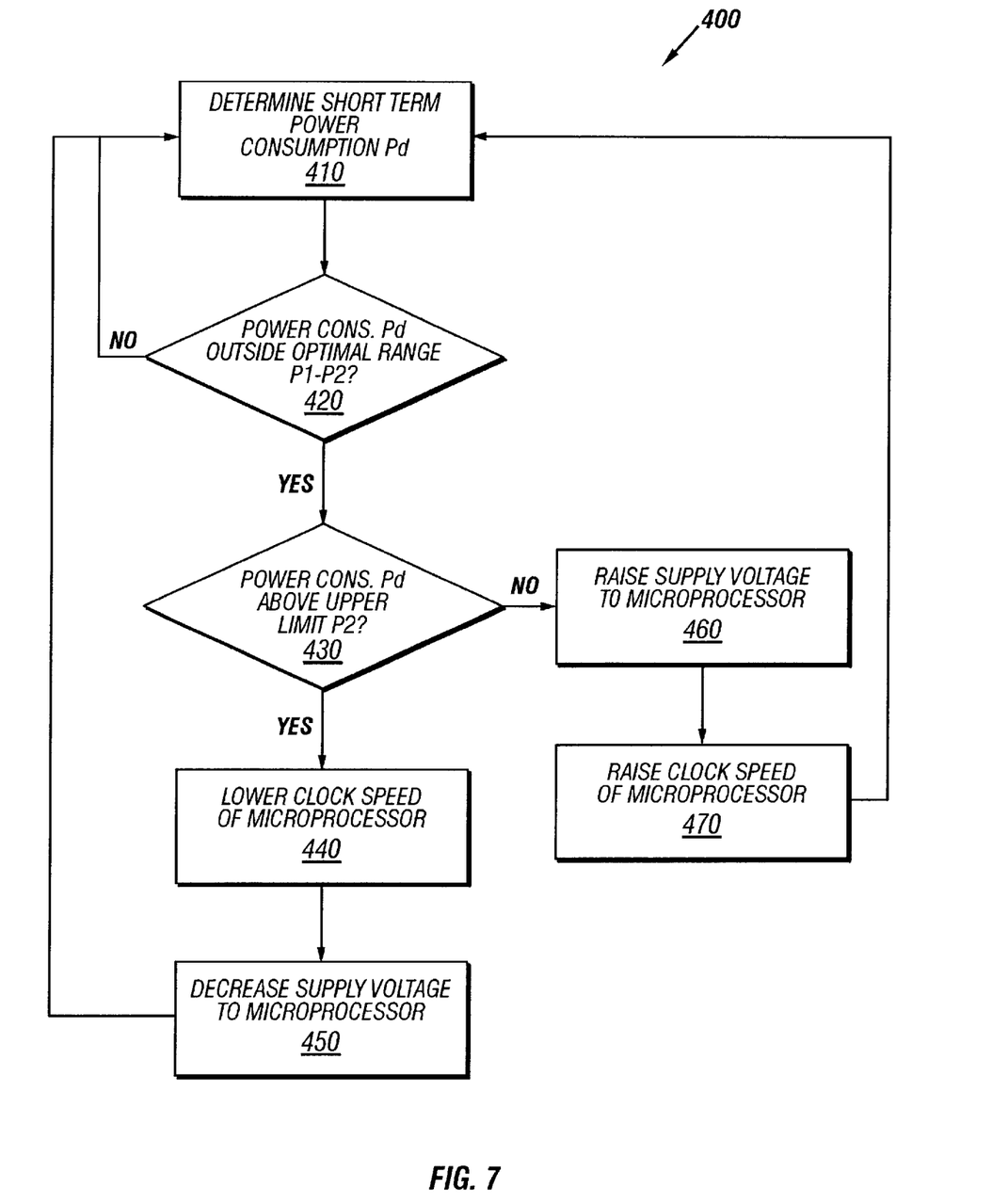
FIG. 7 shows a process for power throttling in accordance with another specific embodiment of the present invention, in which short term power consumption is the measured variable in the closed loop feed back system.

Referring now to FIG. 7, another process 400 for performing the power throttling technique as performed by the control logic 140 is illustrated. The process 400 is similar to the process shown in FIG. 6, except short term power consumption $P_d$ is measured, rather than the temperature of the microprocessor 110. In step 410 the control logic 140 determines the short term power consumption $P_d$ using a power monitoring device such as the power monitor 145 described herein above. As disclosed above, the measurement is considered short term as compared to the rate of change of the measured variable. At step 420, the control logic 140 determines if the power consumption $P_d$ is outside of an optimal power consumption range $P_1$–$P_2$. If the power consumption $P_d$ falls outside of the optimal power consumption range $P_1$–$P_2$, then the process 400 advances, and in step 430, the control logic 140 determines whether the power consumption $P_d$ of the microprocessor 110 is above the power consumption range $P_1$–$P_2$. Based on the determination of step 430, the clock speed and voltage are decreased (steps 440, 450) or increased (steps 460, 470). If, in step 420, the power consumption $P_d$ of the microprocessor 110 is within the power consumption range $P_1$–$P_2$, the process 400 reverts back to step 410.

Example applications for the power monitoring apparatus and processes of the present invention include programmable battery life for a portable PC. If a user has a requirement for a portable PC to operate for a desired time period (a three-hour flight, for example), the portable PC's microprocessor may be programmed to run as fast as possible, but last for the entire time period. The system disclosed herein could then monitor the power consumption of the portable PC's microprocessor and adjust it to maintain the desired battery life, while running as fast as possible within this constraint. In another application, a computer system's cost may be reduced by using a less powerful power supply and a less extensive cooling system in conjunction with the throttling processes and apparatus disclosed herein.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method comprising:
   applying a supply voltage and a clock to a microprocessor;
   monitoring power consumption of the microprocessor;
   determining whether the monitored power consumption is within a predetermined range of values; and
   varying the supply voltage and frequency of the clock in response to the determination, wherein the varying comprises reducing the supply voltage and the frequency of the clock in response to the monitored power consumption being above the predetermined range of values and increasing the supply voltage and the frequency of the clock in response to the monitored power consumption being below the predetermined range of values.

2. The method of claim 1, wherein the monitoring comprises monitoring short term power consumption of the microprocessor.

3. The method of claim 1, wherein the monitoring comprises monitoring a voltage across a resistance.

4. The method of claim 1, wherein the determining comprises determining whether the monitored power consumption is approaching or exceeds an upper limit; and
   wherein the varying comprises reducing the supply voltage and the frequency of the clock in response to the monitored power consumption approaching or exceeding the upper limit.

5. The method of claim 1, wherein the determining comprises determining whether the monitored power consumption is approaching or exceeds a lower limit; and
   wherein the varying comprises increasing the supply voltage and the frequency of the clock in response to the monitored power consumption approaching or exceeding the lower limit.

6. An apparatus comprising:
   a voltage source to apply a supply voltage to a microprocessor;
   a clock source to apply a clock to the microprocessor;
   a power monitor to monitor power consumption of the microprocessor; and
   control logic to determine whether the monitored power consumption is within a predetermined range of values, to reduce the supply voltage and the frequency of the clock in response to the monitored power consumption being above the predetermined range of values, and to increase the supply voltage and the frequency of the clock in response to the monitored power consumption being below the predetermined range of values.

7. The apparatus of claim 6, the power monitor to monitor short term power consumption of the microprocessor.

8. The apparatus of claim 6, the power monitor to monitor a voltage across a resistance between the voltage source and the microprocessor.

9. The apparatus of claim 6, the control logic to determine whether the monitored power consumption is approaching or exceeds an upper limit and to reduce the supply voltage and the frequency of the clock in response to the monitored power consumption approaching or exceeding the upper limit.

10. The apparatus of claim 6, the control logic to determine whether the monitored power consumption is approaching or exceeds a lower limit and to increase the supply voltage and the frequency of the clock in response to the monitored power consumption approaching or exceeding the lower limit.

11. The apparatus of claim 6, comprising the microprocessor.

12. The apparatus of claim 11, wherein the clock source, the power monitor, and the control logic are an integral part of the microprocessor.

13. The apparatus of claim 6, wherein the clock source comprises a phase locked loop.

14. The apparatus of claim 6, wherein the voltage source comprises a switching voltage regulator.

15. A method comprising:
   applying a supply voltage and a clock to a microprocessor;
   measuring a temperature of the microprocessor;
   determining whether the measured temperature is within a predetermined range of values; and
   varying the supply voltage and frequency of the clock in response to the determination, wherein the varying comprises reducing the supply voltage and the frequency of the clock in response to the measured temperature being above the predetermined range of values and increasing the supply voltage and the frequency of the clock in response to the measured temperature being below the predetermined range of values.

16. The method of claim 15, wherein the determining comprises determining whether the measured temperature is approaching or exceeds an upper limit; and
   wherein the varying comprises reducing the supply voltage and the frequency of the clock in response to the measured temperature approaching or exceeding the upper limit.

17. The method of claim 15, wherein the determining comprises determining whether the measured temperature is approaching or exceeds a lower limit; and wherein the varying comprises increasing the supply voltage and the frequency of the clock in response to the measured temperature approaching or exceeding the lower limit.

18. An apparatus comprising:

a voltage source to apply a supply voltage to a microprocessor;

a clock source to apply a clock to the microprocessor;

a temperature sensor to measure a temperature of the microprocessor; and control logic to determine whether the measured temperature is within a predetermined range of values, to reduce the supply voltage and the frequency of the clock in response to the measured temperature being above the predetermined range of values, and to increase the supply voltage and the frequency of the clock in response to the measured temperature being below the predetermined range of values.

19. The apparatus of claim 18, the control logic to determine whether the measured temperature is approaching or exceeds an upper limit and to reduce the supply voltage and the frequency of the clock in response to the measured temperature approaching or exceeding the upper limit.

20. The apparatus of claim 18, the control logic to determine whether the measured temperature is approaching or exceeds a lower limit and to increase the supply voltage and the frequency of the clock in response to the measured temperature approaching or exceeding the lower limit.

21. The apparatus of claim 18, comprising the microprocessor.

22. The apparatus of claim 21, wherein the clock source, the temperature sensor, and the control logic are an integral part of the microprocessor.

23. The apparatus of claim 18, wherein the clock source comprises a phase locked loop.

24. The apparatus of claim 18, wherein the voltage source comprises a switching voltage regulator.

25. The apparatus of claim 18, the temperature sensor to measure, a temperature of a die for the microprocessor.

26. The apparatus of claim 18, the temperature sensor to measure a temperature of a package case for the microprocessor.

* * * * *